March 12, 1968

D. L. KLASS ET AL  3,373,355
APPARATUS FOR MEASURING ELECTRIC FIELD STRENGTH UTILIZING AN ELECTROVISCOUS FLUID
Filed Jan. 17, 1964

INVENTORS.
DONALD L. KLASS
THOMAS W. MARTINEK
ROBERT M. HAINES

ATTORNEY.

United States Patent Office 3,373,355
Patented Mar. 12, 1968

3,373,355
APPARATUS FOR MEASURING ELECTRIC FIELD STRENGTH UTILIZING AN ELECTROVISCOUS FLUID
Donald L. Klass, Barrington, and Robert M. Haines and Thomas W. Martinek, Crystal Lake, Ill., assignors, by mesne assignments, to Union Oil Company of California, Los Angeles, Calif., a corporation of California
Filed Jan. 17, 1964, Ser. No. 338,329
1 Claim. (Cl. 324—92)

ABSTRACT OF THE DISCLOSURE

The invention relates to a method for determining the strength of an electric field comprising subjecting an electroviscous fluid having predetermined electric field-induced viscosity characteristics to the electric field while simultaneously subjecting the fluid to shear at a constant rate, and correlating the shear resistance of the fluid with said predetermined characteristics.

Figure 1:
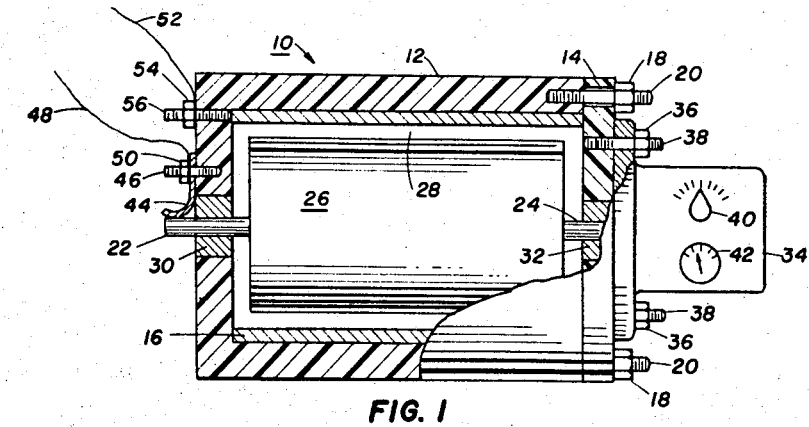

This invention relates to an apparatus and method for making electrical measurements. Mor particularly, the apparatus and method of this invention utilize a field-responsive fluid for making electrical measurements. Electroviscous fluids are especially useful as the field-responsive fluid utilized in the apparatus and method of this invention.

Certain fluids, which are herein designated "field-responsive fluids," respond to the application of the appropriate field by instantaneously, but reversibly, changing in apparent bulk viscosity. More specifically, the term "field-responsive fluid" denotes both electroviscous fluids (sold under the trademark of Electro Fluid) which display a dramatic change in apparent bulk modulus in response to the presence of an electric field and magnetic fluids which display a similar change in apparent bulk modulus in response to the presence of magnetic fields. The field-responsive fluids increase in bulk viscosity in proportion to the strength of the applied field, i.e., they increase in bulk viscosity as the strength of the applied field increases. In the presence of strong fields, the fluids thicken into a semi-solid or solid condition. The energized field-responsive fluids serve to transmit force from the one moving coupling member to a second coupling member. Electroviscous fluids and magnetic fluids are described in U.S. Patents 2,661,596 and 2,886,151 and electroviscous fluids are also described in U.S. Patent 3,047,507.

The electroviscous fluids of the prior art respond to both alternating and direct electric potentials when the potentials are applied to electrodes disposed in contact with the electroviscous fluid. In addition, transient-electric-potential-responsive electroviscous fluids contained in receptacles fabricated of materials of high resistivity exhibit a change in bulk modulus when exposed to a transient electric potential applied by means of electrodes disposed externally with respect to the receptacle. Thus, the electrodes need not contact the electroviscous fluid. Accordingly, it is possible to control the apparent bulk modulus of transient-electric-potential-responsive electroviscous fluids contained in a receptacle of high resistivity by means of an electric potential applied externally of the receptacle. By a transient electrical potential is meant a potential of changing magnitude, i.e, voltage. Thus, as the term is used in this specification, transient electric potentials include potentials of varying positive voltage, as well as alternating potentials. This invention is based upon the discovery that electro-viscous fluids thus energized develop a net activated viscosity which is directly proportional to the square of the strength of the field applied to the electroviscous fluid under dynamic conditions.

In accordance with this invention, a field-responsive fluid is utilized for making electric measurements, e.g., determining the strength of an electric field, including an electrostatic field, or the magnitude of a current. Briefly, the method of this invention for determining the strength of an electric field includes subjecting an electroviscous fluid having predetermined electric-field-induced viscosity characteristics to an electric field while simultaneously subjecting the fluid to shear at a constant rate, and correlating the shear resistance of the electroviscous fluid with the predetermined characteristics thereof to determine the field strength. An apparatus which may be used to carry out the method of this invention includes a conduit through which an electroviscous fluid having predetermined electric-field-induced viscosity characteristics is circulated at a constant rate, electrodes disposed externally or internally of the conduit for subjecting the circulating electro-viscous fluid to the field being measured, and a suitable means for determining the shear resistance of the electroviscous fluid. It will be apparent that such an apparatus can also be used for determining the frequency of an alternating electric potential. Inasmuch as the intensity of a magnetic field produced by an electromagnet is proportional to the magnitude of the energizing electric current, a magnetic fluid can be used as described above with respect to the electroviscous fluid for determining the magnitude of an electric current by utilizing an electromagnet in lieu of the electrodes.

Figure 2:
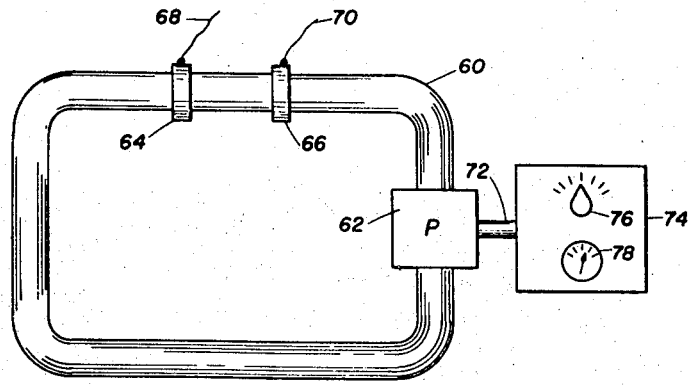
Figures 3, 4:
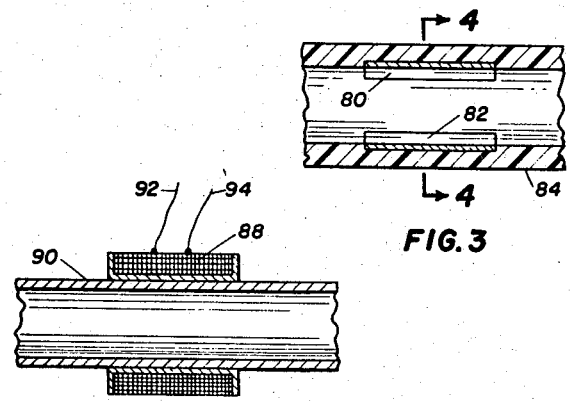
Figure 5:
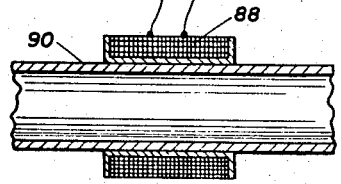

It is therefore an object of this invention to provide an apparatus and method utilizing a field-responsive fluid under constant shear. Another object of this invention is to provide an apparatus and method utilizing a field-responsive fluid for making electrical measurements. Still another object of this invention is to provide an apparatus and method utilizing an electroviscous fluid for determining the strength of an electric field. A still further object of this invention is to provide an apparatus and method utilizing a magnetic fluid for determining the magnitude of an electric current. These and further objects of this invention will become apparent or be described as the description thereof herein proceeds and reference is made to the accompanying drawings in which:

FIGURE 1 is an elevational view, partly schematic and partly in section, of an apparatus for carrying out the method of this invention, FIGURE 2 is an elevational view of a second apparatus for carrying out the method of this invention, FIGURE 3 is a partial sectional view of a modified form of the conduit of the apparatus of FIGURE 2, FIGURE 4 is a sectional view in the plane 4—4 of FIGURE 3, and FIGURE 5 is a partial sectional view of another modified form of the conduit of the apparatus of FIGURE 2.

Referring to FIGURE 1, the reference numeral 10 designates the main housing which is fabricated of an electrically insulating material and includes cup-shaped portion 12 and cover plate 14. Cup-shaped portion 12 is provided with electrically conductive, cylindrical, insert 16. Cover plate 14 is held in place by nuts 18 threaded onto threaded studs 20 extending from cup-shaped portion 12 through apertures in cover plate 14.

Rotatably supported within main housing 10 by trunnions 22 and 24 is drum 26 having an electrically conductive, cylindrical, peripheral surface. Drum 26 is supported axially of insert 16 and the diameter of the peripheral surface of drum 26 is less than the inner diameter of insert 16 to form annular space 28 therebetween. The space between the opposing surfaces of insert 16 and drum 26 is preferably about 0.001 to 0.100 inch, although other spacings may be utilized. An electro-viscous fluid having predetermined electric-field-induced viscosity characteristics is disposed in annular space 28.

Trunnions 22 and 24 pass through bearings 30 and 32, respectively, in fluid-tight relationship therewith. Trunnion 24 extends within control housing 34, which is secured to cover plate 14 by nuts 36 threadably engaged with threaded studs 38 extending from cover plate 14. Control housing 34 includes a constant speed electric motor mechanically connected to trunnion 24 to rotate drum 26, control knob 40 for adjusting the speed of rotation of drum 26, i.e., the motor speed, and indicator dial 42 for indicating the shear resistance of the electroviscous fluid. The features of control housing 34 will not be described in detail since such housings are old and, as for example, may be found in the viscometer art. An example of a viscometer including such a housing is a Fann Model 35 Viscometer.

Trunnion 22 is electrically conductive and in electrically conductive relationship with the peripheral surface of drum 26. Brush 44 contacts trunnion 22 during the rotation thereof. Brush 44 is mounted on threaded stud 46 to which lead wire 48 is electrically connected by nut 50. Lead wire 52, which completes the circuit, is held in place by nut 54 threaded onto threaded stud 56 which is in contact with electrically conductive insert 16.

In operation, drum 26 is rotated with respect to main housing 10 at any desired speed by the motor in control housing 34 to rotate drum 26 with respect to insert 16. When either a direct or transient potential is applied between insert 16 and drum 26, the shear resistance of the electroviscous fluid increases instantaneously to some value greater than the small shear resistance caused by the residual viscosity of the electroviscous fluid. Dial 42 provides means for indicating the shear resistance, e.g., the viscosity of the electroviscous fluid. By varying the strength of the applied electric field between the opposing surfaces of insert 16 and drum 26, the viscosity of the electroviscous fluid can be varied. The device may be calibrated for field strength using any given electroviscous fluid by employing a conventional signal generator to provide a field of varying strength between insert 16 and drum 26. When potentials of varying magnitudes are applied, the viscosity of the electroviscous fluid at various field strengths can be plotted to provide a curve characteristic of the device and electroviscous fluid. By using different electroviscous fluids, different curves will be obtained. Once the characteristics of the device with a given electroviscous fluid have been determined, field strengths can be determined by applying an electric field of unknown strength between insert 16 and drum 26, measuring the shear resistance, e.g., the viscosity of the electroviscous fluid, and correlating this viscosity with field strength by means of the curve obtained in the precalibration procedure. It will readily be apparent to those skilled in the art that dial 42 can be calibrated in terms of field strength, rather than viscosity, and by this expedient reference to the prepared curves or tables is rendered unnecessary.

In general, electroviscous fluids are comprised of about 5 to 50% by volume of particulate non-conducting materials dispersed in a non-polar oleaginous vehicle which is weakly absorbed by the particulate material and has a dielectric constant less than about 5. The non-conducting particles have an average size in the range of about 0.4 to 5.0 microns diameter and include, as for example, finely-divided silica, calcium titanate, barium titanate, aluminum octoate, aluminum oleate, aluminum stearate, crystalline D-sorbitol, and zinc stearate. The oleaginous vehicle is preferably a refined mineral oil fraction having a viscosity within the range of about 50 to 300 SUS at 100° F. and an initial boiling point greater than about 500° F. However, a wide variety of non-polar oleaginous vehicles which are weakly absorbed by the non-conducting particles can be employed, such as white oils, transformer oils, synthetic oils resulting from the polymerization of unsaturated hydrocarbons, fluorinated hydrocarbons in the lubricating-oil viscosity range, tributyl phosphate, etc. Where relatively large volumes of the non-conducting particles are incorporated in the electroviscous fluid, it is usually necessary to add a material to fluidize the mixture and keep the viscosity of the product electroviscous fluid at a reasonable level. For this purpose, up to about 25% by volume of a neutral surfactant, such as polyoxyalkylene ethers, glycerol monooleate, sorbitan sesquioleate, etc., can be incorporated to maintain a mixture of the particles and vehicle as a fluid. If the electroviscous fluid is intended for activation by a constant potential, it is necessary to incorporate in the fluid about 0.1 to 25% by volume of a basic, nitrogen organic compound such as substituted or unsubstituted amines and imidazolines. Specific examples of such compounds include, butyl amine, hexyl amine, ethanol amine, 2-amino-ethyl amine, diethyl amine, pyridine, diethanol amine, triethyl amine, triethanol amine, and tripropanol amine. A variety of polar materials, including water and lower hydroxy-substituted hydrocarbons may be used in an amount of about 1 to 15% by volume to activate the electroviscous fluid.

The electroviscous effect in electric-field-responsive fluids under the influence of an alternating potential is dependent on the frequency of the potential. This dependence is, in turn, a function of the composition of the liquid phase, the dispersed phase, i.e., the composition and volume fraction of the dispersed particulate material, and the strength of the applied field. Thus, the force characteristics of an electroviscous fluid decrease with increasing frequency under a given set of conditions. The apparent cut-off frequency, i.e., the frequency at which the electroviscous fluid effect disappears under a given set of conditions, increases with the volume fraction of the dispersed phase and with increasing voltage. As an example of varying the dependency of the electroviscous effect on the frequency on the potential by varying the composition of the dispersed solid phase, electroviscous fluids compounded using ferroelectric materials such as calcium titanate as the solid phase are more responsive than silica-base electroviscous fluids at higher frequencies under the same operating conditions and solids content. Therefore, if the strength of an alternating field is to be determined in accordance with this invention, it is essential that either the frequency of the field being measured is the same as the frequency of the field used in the precalibration procedure or that the composition and volume fraction of the dispersed phase be selected so that the frequency response of the electroviscous fluid (viz., the frequency at which there is a change in the electroviscous effect due to a change in the frequency of the applied field), is higher than the frequency of the applied alternating field.

Referring to FIGURE 2 wherein an alternative embodiment of an apparatus for determining the strength of a transient electric potential is illustrated, the reference numeral 60 designates a conduit through which an electroviscous fluid is circulated by pump 62. Although the thickness of the wall of tube 60 is not critical, it is preferably a relatively thin-wall conduit since a thick-walled conduit would permit only the determination of the strengths of relatively high voltages. The cross-sectional area of conduit 60 is not critical, but preferably does not exceed about one square inch. Ring-like electrodes 64 and 66 are exposed annularly around conduit 60. It will be evident that at least the portion of conduit 60 separating electrodes 64 and 66 must be fabricated of a high resistive material to maintain electrodes 64 and 66 in electrically insulated relationship. The two electrodes are connected by lead wires 68 and 70 to a source of the potential being measured. Electrodes 64 and 66 may be fabricated of any conductive material, but preferably are made as mono-layer coils of conductive wire held around conduit 60 by means of an adhesive. The dimensions and spacings of the electrodes are not critical, but satisfactory results are obtained employing electrodes having a width of about one-fourth inch with a spacing of about one-fourth inch between electrodes.

Pump 62 is of a positive displacement type and is operated by shaft 72 which, in turn, is rotated at a constant speed regardless of the viscosity of the electroviscous fluid circulating through conduit 60 by an electric motor in control housing 74. Control housing 74 includes control knob 76 for varying the speed of the motor and, hence, the shear rate of the circulating electroviscous fluid, and dial 78 for indicating the shear resistance of the circulating electroviscous fluid as it is circulated at a constant rate through conduit 60. Dial 78 may be a gauge to indicate the fluid pressure within conduit 60. Alternatively, the shear resistance may be determined by using a transmission dynamometer to measure the output torque of the motor, which dynamometer is mechanically connected to dial 78. If desired, dial 78 can be calibrated for a given electroviscous fluid to read directly in terms of field strength.

The operation of the apparatus of FIGURE 2 is similar to the hereinbefore described operation of the apparatus of FIGURE 1 except that the electroviscous fluid is subjected to shear at a constant rate by being circulated at a constant rate through conduit 60 instead of being disposed between two bodies which are moved with respect to each other at a constant rate.

Another tube and electrode configuration is shown in FIGURES 3 and 4 wherein elongated electrodes 80 and 82 are disposed in spaced relationship in conduit 84 axially with respect to conduit 84. Conduit 84 is fabricated of a high resistivity material such as ceramic, Teflon, etc. Inasmuch as the energizing electrodes are disposed in the conduit, this modification of the apparatus of FIGURE 2 can be used for making measurements of both direct and transient electric potentials.

Although this invention has been described in relation to specific embodiments, it will be apparent that obvious modifications may be made by one skilled in the art without departing from the intended scope of this invention. As for example, the electroviscous fluid utilized in the apparatus of FIGURE 1 may be energized by applying the potential to be measured to electrodes disposed externally of cup-shaped member 12. The conduit of the devices of FIGURES 2 to 4 may be cylindrical as illustrated, or of any other convenient shapes such as square, rectangular, hexagonal, octagonal, etc. If desired, the ring-like electrodes illustrated in FIGURE 2 may be disposed internally of conduit 60 or the elongated electrodes of FIGURES 3 and 4 may be disposed on the exterior of the conduit depending on whether or not the potential being measured is a transient electric potential.

It will be apparent to one skilled in the art that the apparatus and method hereinbefore described may be utilized to measure the frequency of an alternating potential. In such a case, the precalibration procedure hereinbefore described is varied by applying to the device potentials of uniform magnitude but differing frequency to obtain a curve in which the shear resistance at various frequencies is plotted. The frequency of an alternating potential is then obtained by applying the electric potential at a predetermined magnitude or voltage, measuring the torque output, i.e., the shear resistance of the electroviscous fluid, and correlating this output with frequency by means of the curve obtained during the precalibration procedure.

Inasmuch as the intensity of the magnetic field produced by a coil is proportional to the magnitude of the energizing current, it will be obvious to one skilled in the art that the above-described apparatus and procedure can be modified by utilizing a magnetic fluid in combination with a coil to determine the magnitude of an electric current. The apparatus of FIGURE 2 can be used for measuring the magnitude of an electric current by modifying the conduit as shown in FIGURE 5. Referring to FIGURE 5, magnetic coil 88 is disposed externally of conduit 90 through which a magnetic fluid is circulated at a constant rate by pump 62 (FIGURE 2). Leads 92 and 94 are used for connecting coil 88 to the source of the current being measured. In operation, the apparatus is precalibrated as described with respect to the apparatus of FIGURE 2, that is, the shear resistance of a given magnetic fluid is determined for varying currents. The magnitude of the current being measured is then determined by correlating the shear resistance of the magnetic fluid with the predetermined shear resistance under varying currents.

The embodiments of the invention in which an exclusive property or privilege is claimed are defined as follows:

1. An electrical field strength measuring apparatus comprising, a closed loop conduit filled with an electroviscous fluid having predetermined electrical field-induced characteristics, pump means for circulating said fluid through the conduit at a constant rate, thereby subjecting the fluid to shear at a constant rate, a constant speed electric motor for driving said pump, electrode means for subjecting said fluid to the electrical field to be measured to thereby vary the viscosity and shear properties of said fluid, and torque measuring means connected to the constant speed motor to measure the torque output of said motor as an indication of the electrical field strength.

References Cited

UNITED STATES PATENTS

| | | | |
|---|---|---|---|
| 2,651,754 | 9/1953 | Perry | 324—92 |
| 2,733,792 | 3/1956 | Saxl | 192—21.5 |
| 2,917,707 | 12/1959 | Perry | 324—21.5 |
| 3,001,619 | 9/1961 | Imperi | 192—21.5 |
| 3,105,379 | 10/1963 | Ellison | 192—21.5 |
| 3,122,914 | 3/1964 | Stabe | 73—59 |
| 3,239,041 | 3/1966 | Klass | 192—21.5 |

RUDOLPH V. ROLINEC, *Primary Examiner.*

J. J. MULROONEY, E. F. KARLSEN,
*Assistant Examiners.*